United States Patent [19]

Hahn et al.

[11] 4,287,258
[45] Sep. 1, 1981

[54] PARTICULATE STYRENE POLYMERS CONTAINING BLOWING AGENT

[75] Inventors: Klaus Hahn, Lampertheim; Hans P. Rath, Gruenstast; Manfred Walter, Speyer, all of Fed. Rep. of Germany

[73] Assignee: BASF Aktiengesellschaft, Fed. Rep. of Germany

[21] Appl. No.: 188,683

[22] Filed: Sep. 19, 1980

[30] Foreign Application Priority Data

Oct. 18, 1979 [DE] Fed. Rep. of Germany ....... 2942182

[51] Int. Cl.$^3$ .............................................. B32B 9/00
[52] U.S. Cl. ..................................... 428/407; 521/57; 521/136
[58] Field of Search ................... 428/407; 521/57, 136

[56] References Cited

U.S. PATENT DOCUMENTS

| 2,989,782 | 6/1961 | Barkhuff, Jr. et al. | 521/57 |
| 3,461,088 | 8/1969 | Stahnecker et al. | 521/57 |
| 3,560,414 | 2/1971 | Miskel, Jr. et al. | 521/57 |
| 3,789,028 | 1/1974 | Heiskel et al. | 521/57 |
| 3,991,020 | 11/1976 | Alvares et al. | 521/57 |
| 4,238,570 | 8/1969 | Shibata et al. | 521/57 |

FOREIGN PATENT DOCUMENTS 408267 10/1975 United Kingdom ...................... 521/57

Primary Examiner—Morton Foelak
Attorney, Agent, or Firm—Keil & Witherspoon

[57] ABSTRACT

Particulate styrene polymers which contain a blowing agent and are surface-coated with a glycerol dialkyl ether, preferably mixed with a glycerol ester. The particles can be foamed, and the foamed particles can be fused to form moldings.

4 Claims, No Drawings

PARTICULATE STYRENE POLYMERS CONTAINING BLOWING AGENT

The present invention relates to particulate styrene polymers containing blowing agent, which on conversion to foam moldings permit the use of short mold residence times, coupled with good fusion of the individual foam particles.

The manufacture of moldings of styrene polymer foams has been disclosed. In industrial practice, a method which has proved useful is initially to heat the foamable polymer particles, containing blowing agent, in a first step at a temperature above their softening point, until they have foamed to give a loose aggregate of the desired bulk density. This process is referred to as "prefoaming." To ensure good processability of the expandable styrene polymers, the individual particles must not sinter, during prefoaming, to form larger agglomerates, as these would interfere with the conveying of the prefoamed material and with the filling of molds. The prefoamed particles are next stored for several hours, and are then foamed further by renewed heating with live steam, in a perforated pressure-resistant mold, which causes them to fuse to form a molding whose dimensions correspond to those of the mold cavity. This second step is referred to as molding. The molded article must cool within the mold, and must be left therein until even the interior of the article has cooled to below the softening point of the styrene polymer. If the molding is prematurely released from the mold, it may distort or collapse. Long cooling times of course increase the manufacturing costs. There have therefore been many attempts to shorten the mold residence time.

U.S. Pat. No. 3,789,028 proposes coating expandable polystyrene particles with glycerol esters of higher fatty acids. It is true that these esters substantially reduce the mold residence time. According to British Pat. No. 1,408,267, the particles are additionally coated with a finely divided inorganic solid, which reduces the tendency to agglomerate. However, it has been found that polystyrene particles containing blowing agent and coated with glycerol esters give foam moldings in which the fusion of the individual foam particles is not the optimum achievable.

It is an object of the present invention to provide particulate styrene polymers, containing blowing agent, which do not tend to agglomerate and which, on processing to give foam moldings, permit the use of short mold residence times, coupled with good fusion of the foam particles.

We have found that this object is achieved, according to the invention, if the particles are surface-coated with from 0.05 to 1% by weight of a glycerol dialkyl ether. The minimum mold residence times are thereby shortened by from 20 to 50%, compared to what is achievable with the conventional coating agents based on glycerol esters, and substantially better fusion is achieved. The foam moldings show a uniform density and good dimensional stability.

For the purposes of the invention, styrene polymers are polystyrene and copolymers of styrene with other α,β-olefinically unsaturated compounds which contain at least 50 percent by weight of styrene as copolymerized units. Examples of suitable comonomers are α-methylstyrene, nuclear-halogenated styrenes, nuclear-alkylated styrenes, acrylonitrile, esters of acrylic acid or methacrylic acid with alcohols of 1 to 8 carbon atoms, N-vinyl compounds, eg. vinylcarbazole, maleic anhydride and also small amounts of compounds which contain two polymerizable double bonds, eg. butadiene, divinylbenzene or butanediol diacrylate.

The particulate styrene polymers are prepared by conventional processes. They may be obtained in the form of beads, of cylindrical granules or of lumps, such as are obtained on milling mass polymers. The particles advantageously have a diameter of from 0.1 to 6 mm, especially from 0.4 to 3 mm.

The styrene polymers contain one or more homogeneously dispersed blowing agents. Examples of suitable blowing agents are hydrocarbons or halohydrocarbons which are gaseous or liquid under normal conditions, which do not dissolve the styrene polymer, and which boil below the softening point of the polymer. Specific examples of suitable blowing agents are propane, butane, pentane, cyclopentane, hexane, cyclohexane, dichlorodifluoromethane and trifluorochloromethane. In general, the styrene polymers contain from 3 to 15 percent by weight, based on polymer, of the blowing agents.

According to the invention, the particulate styrene polymers are coated with from 0.05 to 1, preferably from 0.1 to 0.5, % by weight of a glycerol dialkyl ether. Preferred glycerol dialkyl ethers are those of the general formula

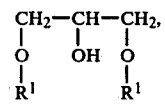

where $R^1$ is of alkyl of 12 to 30 carbon atoms and is preferably linear. In addition to the glycerol dialkyl ethers, conventional agents for reducing the mold residence time, for example glycerol esters, eg. glycerol monostearate, may be present as a coating on the styrene polymer particles. It is particularly advantageous to use mixtures of glycerol dialkyl ethers with glycerol esters in a weight ratio of from 5:1 to 1:5.

The glycerol dialkyl ethers are, at least predominantly, present as a very uniformly distributed coating on the surface of the expandable polystyrene particles. The manner in which the coating is applied is not critical; for example, the styrene polymer particles may simply be tumbled with the finely divided glycerol dialkyl ether in a commercial mixer. However, it is also possible to apply the glycerol dialkyl ether from an aqueous dispersion or a solution in an organic solvent, in which case the solvent or the water must be removed during application. A further possibility is to add the glycerol dialkyl ethers to the styrene bead polymerization batch at or toward the end of the suspension polymerization.

The styrene polymers may also contain other additives which imapart certain properties to the expandable products. Examples are flameproofing agents based on organic bromine or chlorine compounds, eg. trisdibromopropyl phosphate, hexabromocyclododecane, chloroparaffin and synergistic agents for flameproofing agents, eg. dicumyl peroxide and other easily decomposable organic dyes, lubricants, fillers and additives having an antilumping effect in the prefoaming step, eg. zinc stearate, melamine-formaldehyde condensates or silica. Depending on the intended effect, the additives may be homogeneously dispersed in the particles or present as a surface coating.

The novel particulate styrene polymers containing blowing agent can be foamed by conventional methods to give foam moldings having densities of from 5 to 100 g/l. The minimum mold residence times (MMRT) are determined by the following method: the prefoamed styrene polymer particles are fused, by treatment with steam in a mold, to give a molding in the center of which is located a pressure sensor. The interval from the start of cooling to the time at which the pressure in the interior of the molding has dropped to 1.05 bar is determined. Experience has shown that at this pressure the moldings can be safely released.

To assess the fusion, 5 cm thick foam samples which have been stored for one day are broken by bending over an edge. The ratio of torn particles to total particles visible in the fracture surface is estimated and quoted in percent. A fracture pattern of 0% means that the adhesion of the particles to one another is less than the strength of the particles itself. 100% means that only particles which have been torn are visible.

EXAMPLES

Expandable polystyrene containing 6.4% by weight of n-pentane and having a mean particle diameter of 1.5 mm was coated with various substances by tumbling in a paddle mixer. The polystyrene particles were prefoamed by means of a stream of steam in a continous stirred prefoamer, until the bulk density was 15 g/l, and were then stored for 24 hours, after which they were welded in a block mold by steaming under a pressure of 1.8 bar for 20 seconds. The measured minimum mold residence times and the degrees of fusion are shown in the Table.

TABLE

| | | | | | | | |
|---|---|---|---|---|---|---|---|
| Glycerol monostearate | [% by weight] | 0.4 | — | 0.2 | 0.1 | — | — |
| Glycerol distearyl ether | [% by weight] | — | 0.4 | 0.2 | 0.3 | — | — |
| Glycerol dihexadecyl ether | [% by weight] | — | — | — | — | 0.4 | — |
| Glycerol dimyristal ether | [% by weight] | — | — | — | — | — | 0.4 |
| Minimum mold residence time | [minutes] | 38 | 22 | 21 | 22 | 23 | 26 |
| Degree of fusion assessed from fracture | [%] | 40 | 85 | 65 | 70 | 80 | 80 |

The coatings additionally contained 0.02% by weight of Zn stearate

We claim:

1. A particulate styrene polymer, containing blowing agent, which is surface-coated with from 0.05 to 1% by weight of a glycerol dialkyl ether.

2. A particulate styrene polymer containing blowing agent, as claimed in claim 1, wherein the glycerol dialkyl ether has the general formula

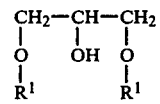

where $R_1$ is alkyl with 12 to 30 carbon atoms.

3. A particulate styrene polymer containing blowing agent, as claimed in claim 1, wherein the coating consists of a mixture of a glycerol dialkyl ether and a glycerol ester in the weight ratio of from 5:1 to 1:5.

4. A particulate styrene polymer containing blowing agent, as claimed in claim 1, wherein the coating consists of a mixture of a glycerol dialkyl ether and an antilumping additive, preferably zinc stearate, a melamine-formaldehyde condensate or silica.